(12) United States Patent
Dmitrievich et al.

(10) Patent No.: US 11,156,722 B2
(45) Date of Patent: Oct. 26, 2021

(54) POST-PROCESSING GLOBAL NAVIGATION SATELLITE SYSTEM (GNSS) POSITION DATA USING MIRRORED GNSS DATA

(71) Applicant: TRIMBLE INC., Sunnyvale, CA (US)

(72) Inventors: Boriskin Aleksey Dmitrievich, Moscow (RU); Kozlov Dmitry Gennadievich, Moscow (RU); Lyoskin Victor Valerianovich, Moscow (RU)

(73) Assignee: Trimble Inc., Sunnyvale, CA (US)

(*) Notice: Subject to any disclaimer, the term of this patent is extended or adjusted under 35 U.S.C. 154(b) by 413 days.

(21) Appl. No.: 16/400,242

(22) Filed: May 1, 2019

(65) Prior Publication Data

US 2020/0132860 A1 Apr. 30, 2020

(30) Foreign Application Priority Data

Oct. 31, 2018 (RU) .......................... RU2018138394

(51) Int. Cl.
*G01S 19/41* (2010.01)
*G01S 19/07* (2010.01)
(Continued)

(52) U.S. Cl.
CPC ............. *G01S 19/41* (2013.01); *G01S 19/07* (2013.01); *G01S 19/10* (2013.01); *G01S 19/40* (2013.01); *G01S 19/426* (2013.01); *G01S 19/52* (2013.01)

(58) Field of Classification Search
CPC .......... G01S 19/41; G01S 19/07; G01S 19/10; G01S 19/40; G01S 19/426; G01S 19/52
(Continued)

(56) References Cited

U.S. PATENT DOCUMENTS

| 2013/0141276 A1 | 6/2013 | Artushkin et al. |
| 2014/0372026 A1 | 12/2014 | Jacques et al. |
| 2016/0252354 A1* | 9/2016 | Georgy ............... G01C 21/165 |
| | | 701/500 |

FOREIGN PATENT DOCUMENTS

| CA | 2923987 A1 | 4/2015 |
| CN | 106772483 A | 5/2017 |
| (Continued) | | |

OTHER PUBLICATIONS

Decision of Grant, Russian Application No. 2018138394, dated Jun. 14, 2019.
(Continued)

*Primary Examiner* — Bo Fan
(74) *Attorney, Agent, or Firm* — Snell & Wilmer LLP; Kent A. Lembke

(57) ABSTRACT

A post-processing system providing forward processing (FP) of original GNSS raw data and alternative forward-backward processing (BP) of modified GNSS raw data and combining results of the FP and modified BP to enhance accuracy of position data derived from GNSS raw data. The post-processing system includes a GNSS processing engine, such as a real-time PVT engine, that processes GNSS raw data files as real time data streams equally for FP and BP. The backward processing is performed on a set of GNSS raw data that is mirrored from the original GNSS raw data. The modified BP uses the same algorithms of the PVT engine in a forward run but with the mirrored GNSS raw data to provide BP including position estimate with associated accuracy estimates for each data epoch. A forward/backward combiner combines results of the FP and the modified BP to provide final position data with enhanced precision.

23 Claims, 6 Drawing Sheets

(51) Int. Cl.
  *G01S 19/10* (2010.01)
  *G01S 19/52* (2010.01)
  *G01S 19/42* (2010.01)
  *G01S 19/40* (2010.01)

(58) Field of Classification Search
  USPC .................. 342/350, 352, 368, 372, 377
  See application file for complete search history.

(56) References Cited

FOREIGN PATENT DOCUMENTS

| | | |
|---|---|---|
| CN | 107423121 A | 12/2017 |
| RU | 496124 C1 | 10/2013 |

OTHER PUBLICATIONS

Russian Search Report, Russian Application No. 2018138394, dated Jun. 14, 2019.
UNAVCO, "Dataworks for GNSS: Manual for Data Repositories," https://www.unavco.org/software/data-management/dataworks/lib/docs/Dataworks_for_GNSS.pdf, Jan. 5, 2016.
Monikes et al. "Post-Processing GNSS/INS Measurements Using Tightly Coupled Fixed-Interval Smoother Performing Carrier Phase Ambiguity Resolution," The Institute of Navigation, Apr. 27, 2006, pp. 283-290.
Extended European Search Report, for Application No. 19205116.7, dated Mar. 17, 2020.

* cited by examiner

POST-PROCESSING GLOBAL NAVIGATION SATELLITE SYSTEM (GNSS) POSITION DATA USING MIRRORED GNSS DATA

BACKGROUND

1. Field of the Invention

The present invention generally relates to satellite navigation including determining position data from signals from global navigation satellite system (GNSS) satellites and, more particularly, to a method and corresponding system for enhancing the precision of GNSS-derived position data by creating and using mirrored GNSS data in a GNSS navigation engine (e.g., a position, velocity, and time (PVT) engine often provided in GNSS receivers and other satellite navigation tools).

2. Relevant Background

GNSS stands for Global Navigation Satellite System, and GNSS is the standard generic term for satellite navigation systems that provide autonomous geo-spatial positioning with global coverage. GNSS includes constellations of satellites including those in the U.S. Global Positioning System (GPS), the Russian Global Navigation Satellite System (GLONASS), the European Galileo system, the Chinese BeiDou system, and other regional systems.

The use of GNSS receivers to provide positional data has become widespread with GNSS receivers being found in many wireless and cellular devices such as navigational devices provided in vehicles, in cellphones, in surveying equipment, in agricultural and construction equipment, and so on. GNSS receivers are electronic devices that receive and digitally process the signals from one or more GNSS satellite constellations, and each GNSS receiver includes a processing engine to provide the user with position, velocity, and precise time (PVT) such that the processing engine or software module may be considered a PVT engine. The PVT engine of the GNSS receiver determines three dimensional (3D) position (longitude, latitude, and height) and clock error. The position is determined based on its measured distance from a set of satellites. GNSS receivers typically use signals from at least four satellites to obtain a position, and there often needs to be a direct line of sight to obtain a proper lock on the satellite's signal for accurate position determination.

There are many applications where the position data is provided and used in real time, and GNSS receivers have been developed that provide highly accurate outputs such as centimeter positioning. In many of these real time applications, though, it may be acceptable to periodically lose tracking with satellites and, hence, to temporarily lose accurate positioning. The loss of signal lock can happen when a GNSS receiver is moved into spaces with harsh satellite navigation conditions or into challenging environments such as urban canyons, spaces under bridges, and the other locations where signal lock with one or more satellites may be periodically lost as line of sight is blocked to one or more of the four satellites.

In other cases, though, high accuracy positioning is required but the output is not required in real time. For example, a surveyor may do field work by moving a portable device with a GNSS receiver throughout a space being surveyed and then return to their offices to analyze the results of their work, and the positioning data is not required in real time. In such situations, post-processing techniques can be used to process the position (or navigation) data collected and generated by the GNSS receiver to enhance its precision. In classic post-processing solutions, forward and backward runs are performed on the GNSS signal data, and the results are combined to enhance the accuracy of the position data derived from the GNSS signals. In a forward run (or during forward processing), the GNSS or observation data is processed through the PVT engine in the forward direction, starting with data associated with the initial time of data collection and continuing through to the end or last time of data collection. A backward run (or backward processing) is the opposite with the GNSS data run through the PVT engine starting with data associated with the end or last time of data collection and continuing to data associated with the initial time of data collection.

Unfortunately, some GNSS navigation engines, which may be highly accurate even when the GNSS receiver is used in harsh conditions, are only able to perform forward runs and are not able to process the GNSS data backwards. Hence, there remains a need for a method of utilizing existing GNSS navigation engines during post-processing including backward runs of GNSS data to enhance accuracy of position data.

SUMMARY

Briefly, a post-processing system (and associated post-processing method) is described that is configured to provide forward processing (FP) and modified (or alternative) backward processing (BP) and to combine the results of the FP and modified BP to enhance precision of position data derived from GNSS data. The post-processing system includes a GNSS processing engine, such as a real-time PVT engine, that processes data files as data streams in a real-time manner and generates position with accuracy estimates for each data epoch. The backward processing or BP is identified as modified or alternative BP because it is performed on a set of GNSS raw data that is mirrored from the GNSS raw data used in the FP (or is mirrored GNSS data generated by a mirrored GNSS raw data generator that may include one or more mirroring functions). Hence, the modified BP uses the same algorithms of the real-time PVT engine but with the mirrored GNSS data to provide backward processing including position with accuracy estimates for each data epoch with a backward run. The post-processing system further includes a forward/backward combiner that combines the results of the FP and the modified BP to provide position (and, in some cases, other) data with enhanced precision.

In FP, data is processed in time order such as 0, 1, 2 . . . 9 seconds while in BP data is processed in backwards order such as 9, 8, 7 . . . 0 seconds. Combining the results of FP and BP increases accuracy and reliability of position data derived from GNSS data. The inventors recognized, though, that BP is not supported in many real-time GNSS processing engines such as real-time PVT engines including the Blade engine, the Titan engine, and the like. It was estimated by the inventors that it may require many months of development including difficult modifications to core sub-engines or routines to modify these real-time PVT engines to support BP, but it was also determined that these PVT engines are desirable for use in post-processing due to their design for use in even harsh satellite navigation environments. With these challenges in mind, the inventors created an alternative or modified BP that uses mirrored GNSS data. Briefly, FP processes GNSS data ("x") using a set of algorithms F( ) in a PVT engine (e.g., FP=F(x)). Conventional BP would process the same GNSS data ("x") using a modified algorithm, Y( ) (e.g., BP=Y(x)). In contrast, the new modified or alternative BP uses the same algorithms in the PVT engine with modified data (mirrored GNSS data provided as y=Z(x), with Z representing a mirroring function) (e.g., modified BP=F(y)).

More particularly, a system is provided for post-processing global navigation satellite system (GNSS) data to enhance position accuracy. The system includes a processor (or processors) and memory (or data storage devices) storing a GNSS data file that may be received from one or more GNSS receivers (such as one on a rover and one in a base). The system also includes a first set of code (or a first software routine or executable) executed by the processor to provide a position, velocity, and time (PVT) application, and the PVT application processes the GNSS data file with a forward run to generate a first forward run position file. The system further includes a second set of code (or a second software routine or executable) executed by the processor to provide a mirror time application modifying the GNSS data file to generate a mirrored GNSS data file. During system operations, the PVT application processes the mirrored GNSS data file with a forward run to generate a second forward run position file (e.g., to provide modified BP of GNSS data). Further, the system includes a third set of code (or a third software routine or executable) executed by the processor to provide a combiner application combining the first and second forward run position files to generate a precise position file including position data with higher accuracy at one or more epochs than in only one of the first and second forward run position files.

In many embodiments, the GNNS data file will not be a file from a single GNSS receiver. For example, the GNSS data file may include a GNSS file from a base and a GNSS file from a rover. The GNSS data file and the mirrored GNSS data file may take the form of Receiver Independent Exchange Format (RINEX) files defining the format and content of the GNSS data in each file. In many cases, the PVT application is a forward-only PVT application such as a real-time PVT application such as Blade, Titan, Astra, or the like known to have high precision in harsh environments for satellite navigation such as urban canyons, roads passing under bridges, and the like.

In some embodiments of the mirror time application, the mirrored GNSS data file is generated so that it includes measurement epochs of the GNSS data file in reverse order. Further, the mirror time application may modify measurements read from the GNSS data file to form mirrored measurements in the mirrored GNSS data file including, for each of the reverse order measurement epochs, modifying range and phase by difference in calculated distance and modifying doppler by difference in calculated velocity.

In preferred embodiments, the mirror time application is configured to generate the mirrored GNSS data file such that residuals in the GNSS data file at each of the measurement epochs match (e.g., are the same as) residuals in the mirrored GNSS data file at each of the reverse order measurement epochs. To this end, the mirror time application mirrors orbit data provided in the mirrored GNSS data file by modifying ephemeris in the GNSS data file such that a satellite associated with data in the GNSS data file is flying backwards based on its satellite positions.

DETAILED DESCRIPTION

In general, the following describes systems and methods for post-processing GNSS data using mirrored GNSS data to perform a modified or alternative backward processing (BP). In the systems and methods, forward processing (FP) is performed with a real-time PVT engine on a set of GNSS data from a GNSS receiver. The GNSS data is modified to generate mirrored GNSS data (such as with a mirror time application or mirrored GNSS data generator), and then the modified BP is achieved by processing the mirrored GNSS data using the real-time PVT engine used to perform the FP. A forward/backward combiner is then used to combine the results of the FP and the modified BP to provide position data with improved accuracy.

In some likely embodiments, the mirror time application and its generated mirrored GNSS data is integrated into post-processing software (e.g., a kinematics post-processing suite) run on a post-processing device (e.g., nearly any computing device or computer system). The inventors understood that it was known that forward/backward runs of a real-time PVT engine with proper combining of results can deliver improved performance in post-processing. However, many of the existing (and to be developed) real-time PVT engines do not support running GNSS data backwards in time. Also, the inventors believed that it is not easy or a simple task to modify these engines to support backward runs without introducing risk to the forward real-time PVT functionality. However, it was also determined that it is very desirable to keep the very same core PVT engine in many cases for real-time processing and also for post-processing of GNSS data to improve accuracy.

The inventors determined that if it was desirable to not transform the PVT engine then it would be useful to try to transform the raw GNSS data. The mirror time application is configured to construct, from the raw GNSS data, mirrored GNSS data that may be made up of base GNSS files, rover GNSS files, and/or navigational data files where virtual time is still running forward. This allows the existing PVT engine to be used to process the mirrored GNSS data. Then, the conventional or forward PVT result and the mirrored or backward PVT result can be wisely combined to get a unique post-processing solution. While the mirror time (MT) application or technology can be used together with almost any real-time PVT engine, the inventors demonstrated its performance and usefulness with the mainstream ABlade.exe engine. Further, the testing performed with this PVT engine showed that the use of the modified BP that used the mirrored data with the forward-only PVT engine noticeably improved post-processing performance by reusing the existing real-time PVT engine. The mirror time application can be integrated with nearly any post-processing software tool such as the Mobile Mapper Office, Easy Post Process, and the like that use the Blade engine.

Figure 1:
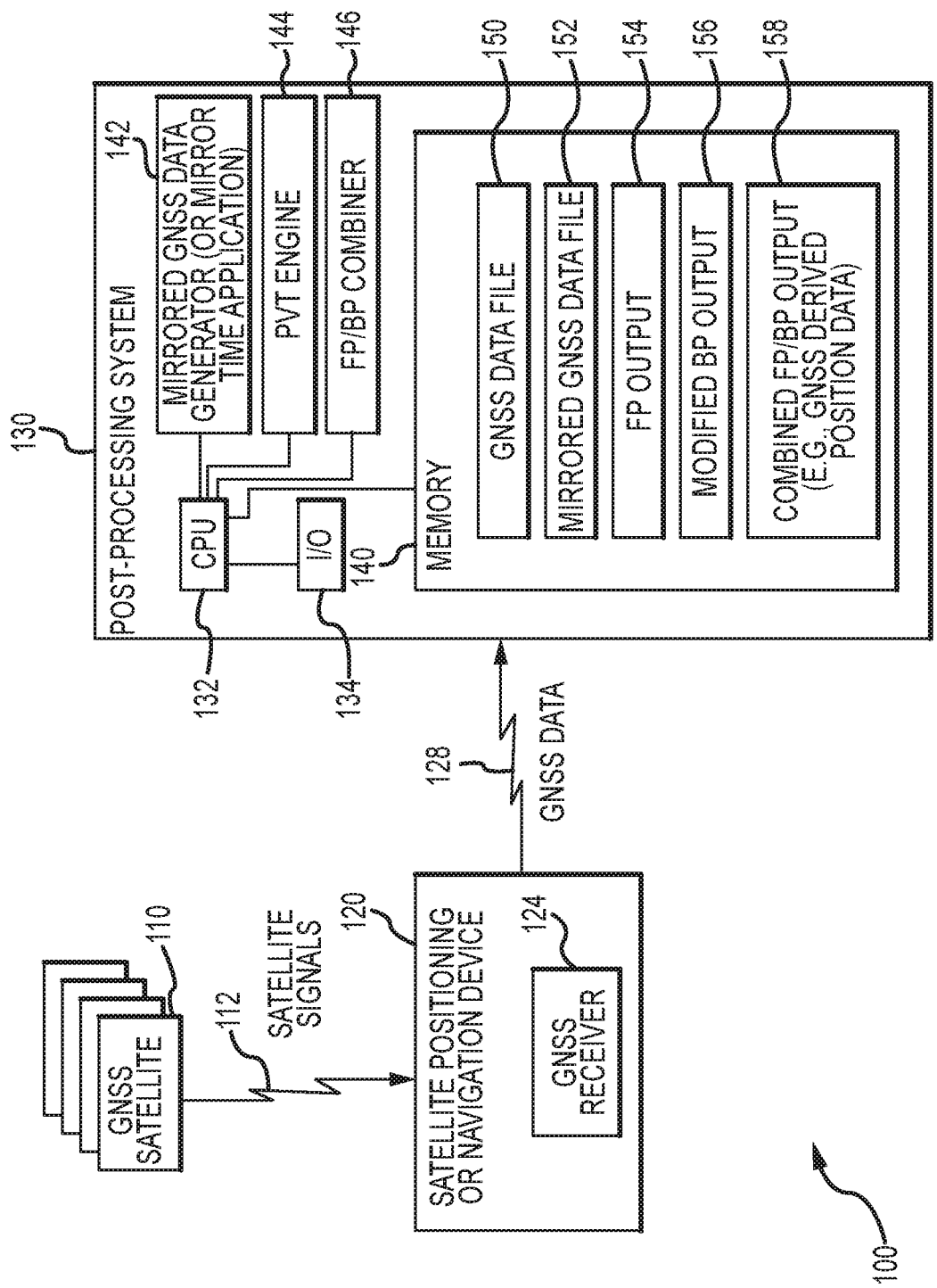
FIG. 1 is a functional block diagram of a system including a post-processing system configured with the mirror GNSS technology of the present description for enhanced derivation of position data.

FIG. 1 illustrates a network or system 100 of components useful for implementing the post-processing of GNSS data made possible with the mirror time technology described herein. As shown, the system 100 includes one or more constellations of GNSS satellites 110 that output signals 112 that can be processed to obtain position and other navigational or positioning data. For example, the satellites 110 may include satellites in the U.S. Global Positioning System (GPS), the Russian Global Navigation Satellite System (GLONASS), the European Galileo system, the Chinese BeiDou system, and other regional systems.

The system 100 further includes a device 120 (e.g., a satellite positioning or navigation device such as a mobile GIS data collector or the like) that includes a GNSS receiver 124, which is operable as is well-known for receiving satellite signals 112 with an antenna. The GNSS receiver 124 processes the signals 112 to generate raw GNSS data (also considered raw satellite navigation system data) that as shown with arrow 128 is transmitted or transferred in a wired or wireless manner to a post-processing system 130 for further processing using the mirror time techniques discussed below. The GNSS receiver 124 may take a wide variety of forms to practice the system 100 such as precision GNSS receiver modules available from Trimble Navigation Limited such as the Trimble® BD940 GNSS receiver module or other navigation receiver used in the field of geodesy. An exemplary use would be the device 120 taking the form of a surveying tool used in the field by an operator to collect a set of position readings, and the operator then transferring the collected GNSS data 128 to the post-processing system 130 to obtain more accurate results than available with real-time processing and because real-time results are not required.

The post-processing system 130 may take the form of nearly any computer, computer system, or computing device and includes a processor(s) 132 that manages input/output (I/O) devices 134 and memory (or data storage devices) 140 of the system 130. The I/O devices 134 may include a keyboard, a touchscreen, a touchpad, a mouse, voice recognition software/hardware, a monitor, and the like to allow an operator to view data and to provide input (such as to initiate post-processing and to select which GNSS data 128 to process). The I/O devices 134 further include components for receiving in a wired or wireless manner the GNSS data 128. The processor 132 acts to store the GNSS data 128 in a file 150 in the memory 140. The GNSS data file 150 contains raw GNSS data gathered and initially processed by the GNSS receiver 124, and it may take a variety of forms to practice the post-processing system 130. In one useful embodiment, the GNSS data file 150 takes the form of a Receiver Independent Exchange Format (RINEX) file. RINEX is a data exchange format for raw satellite navigation system data, which allows post-processing of the data in file 150 to produce more accurate results. Originally collected data 128 from the GNSS receiver may be expressed in different formats (e.g., RINEX, Ashtech G-file, Trimble TOx file, uBlox, and so on), and the mirror time application 142 or another routine (not shown) may be used to convert the GNSS data 128 to a common format (e.g., RINEX or the like) prior to storage as GNSS data file 150. The GNSS data file 150 may include all or a subset of the output of the receiver 124 including position, velocity, and time and also a series of measurements and corrections used to calculate these quantities or generated (or received) by the GNSS receiver 124. The GNSS data file 150 may also include intermediate measures obtained by the GNSS receiver 124.

The processor 132 executes code/instructions and/or runs software (which may be stored in memory 140 or other storage accessible to the processor 132) to provide the functionalities of the mirrored GNSS data generator (or mirror time application) 142, a PVT engine 144, and a FP/BP combiner 146. These functions are described in detail below. Briefly, though, the mirrored GNSS data generator 142 processes the GNSS data file 150 to modify its content to create a mirrored GNSS data file 152 that can be taken as input by the PVT engine 144 to provide a form of modified backward processing (BP) by performing a forward run or forward processing (FP) on this file 152. In this regard, the PVT engine 144 may take the form of a high-precision, real-time navigation engine 144 such as Blade, Titan, Astra, or the like that is configured for forward runs only. During post-processing, the processor 132 then uses the PVT engine 144 to process the GNSS data file 150 to generate the FP output 154 and to process the mirrored GNSS data file 152 to generate the modified BP output 156. Next, the processor 132 calls or runs the FP/BP combiner 146 to combine the FP output 154 and the modified BP output 156 to generate the combined FP/BP output 158, which may include GNSS-derived position data with a higher accuracy than provided by the FP output 154 considered alone in many applications especially those where the device 120 is used in harsh environments such as urban canyons or the like. Examples of the post-processing achieved by a system like post-processing system 130 with the software applications/engines 142, 144, and 146 are described in greater detail below including with test runs and with code examples.

Figure 2:
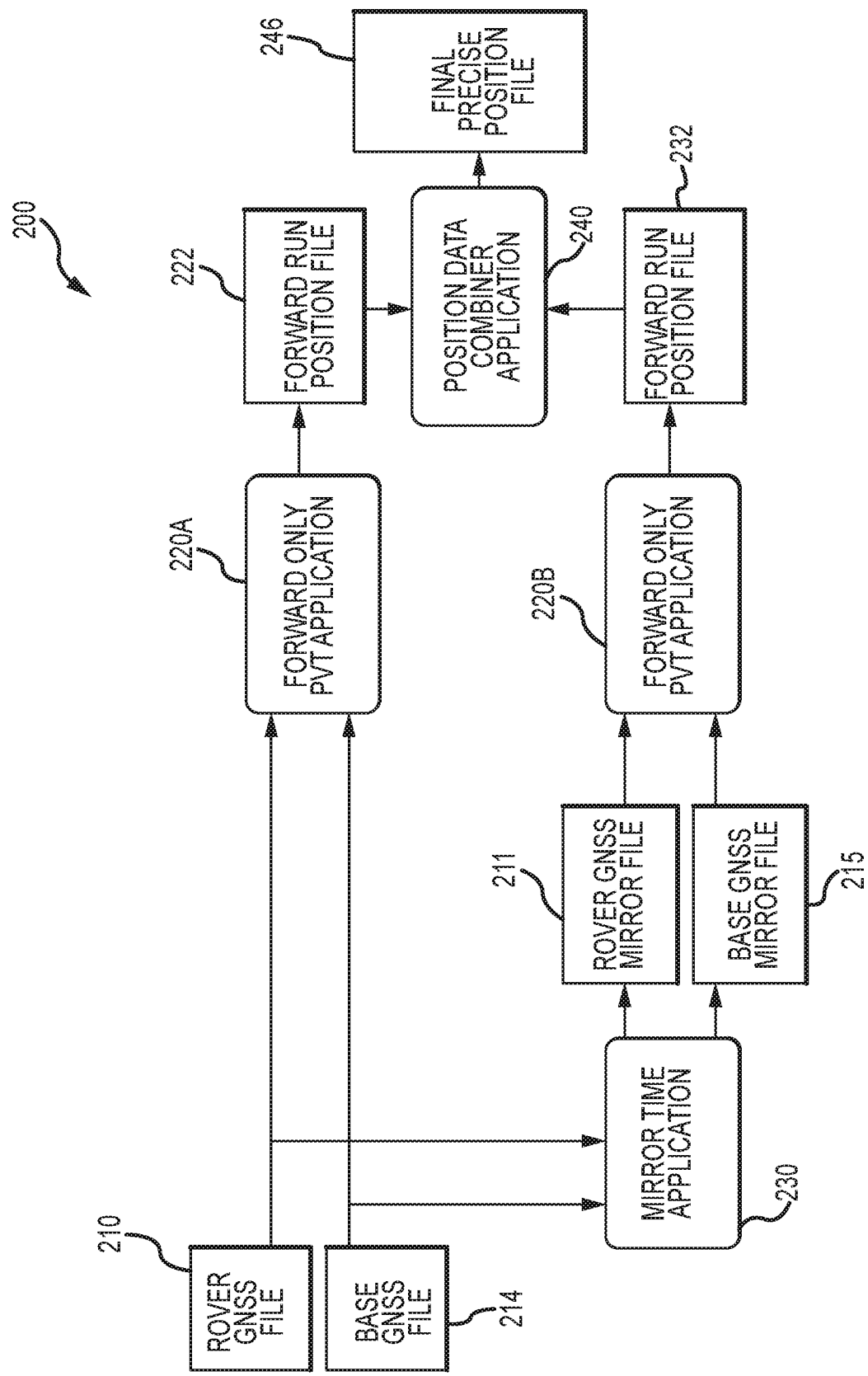
FIG. 2 is a data flow diagram during post-processing using mirror time techniques described herein and as may be carried out during operation of the system of FIG. 1.

FIG. 2 is a data flow diagram 200 showing data flow during post-processing that involves generation and use of mirrored GNSS data according to the present description and as may be seen during operations of the post-processing system 130 of FIG. 1. In the embodiment of FIG. 2, the input raw GNSS data (e.g., the GNSS data file 150 of FIG. 1) takes the form of a rover GNSS file 210 and a base GNSS file 214 (which again may be provided as RINEX files or other file formats output by GNSS receivers from a roving device and from a base station). These two GNSS data files 210, 214 are provided as input to a forward-only PVT application that performs forward processing (FP) 220A and outputs a forward run position file 222 (e.g., providing position data along with accuracy estimates as may be the case for FP output 154 discussed in FIG. 1).

A mirror time application (e.g., the generator 142 shown in FIG. 1) also takes the two GNSS data files 210, 214 as input and at 230 modifies the data to generate a rover GNSS mirror file 211 and a base GNSS mirror file 215, respectively. The mirroring function of the application 230 (and of the generator 142 of FIG. 1) is discussed in detail below. The mirror files 211, 215 are then provided as input to the same forward-only PVT application as used to create the forward run position file 222, and it provides a form of modified backward processing (BP) by performing a forward run 220B on the mirrored GNSS data in mirror files 211, 215 to generate a second forward run position file 232 (or modified BP output 156 as described in FIG. 1). These two position files 222, 232 are fed as input to a position data combiner application (such as FP/BP combiner 146 of FIG. 1) that at 240 combines them to create a final precise position file 246 that contains higher accuracy position data (than provided by either file 222, 232 considered alone).

As discussed above, the inventors recognized that many forward-only PVT engines include many sub-engines and complicated source code that would make it difficult to modify to perform backward processing. With this in mind, the inventors determined that it would be preferable to generate a mirror time method (and a mirror time software application (or mirrored GNSS data generator)) that would be able to modify raw GNSS data so that it could be used as input to the forward-only PVT engine to achieve backward processing of the data.

The mirror time method or technique begins with a raw GNSS data file such as a RINEX file and reorders measurements at each epoch or measurement time period. For example, a RINEX1 file may be used with 0 to 100 second epochs and corresponding measurements (Meas1), and it is desirable to create a Mirror RINEX2 file with 100 to 200 second epochs and corresponding measurement (Meas2). Stated differently, mirror time is 100 second, and this can be represented as Meas2(T=100)=Meas1(T=100); Meas2(T=101)=Meas1(T=99); . . . ; and Meas2(T=200)=Meas1(T=0).

This is a new and interesting modification of the GNSS data to allow a BP output to be created using a forward run through a forward-only PVT engine. However, for correct processing by the PVT engine, it is desirable to use the same residuals (Res) on the backward run and on the forward run as shown by Res2(T=101)=Res1(T=99). To this end, the mirror time method not only mirrors the measurement from the GNSS data but also the orbit data (which is used to compute distance (Dist)) and the correction data (Corr). This is shown as Res(T)=Meas(T)−Dist(T)−Corr(T).

Further, the mirror time method also involves mirroring orbits. To mirror orbits, the ephemeris in the GNSS data is modified in such a way to simulate a satellite that provided the GNSS data is flying backward as can be represented as SVxyz2(T=101)=SVxyz1(T=99) . . . SVxyz2(T=200)=SVxyz1(T=0) (where SVxyz is the satellite position). Kepler orbits, which are used for GPS, GAL, BDS (non-geostationary), QZS, and IRN, can be mirrored against the mirror time such as by using function MirrorKeplerEphemeris( ) provided in the code of the Computer Program Listing Appendix provided at the end of the Detailed Description. SBAS ephemeris can also be mirrored such as by using the function MirrorSbaEphemeris( ) provided in the Computer Program Listing Appendix. As for correction data, atmosphere models such as Tropo (which is used by default in the Blade and Titan PVT engines) do not need any actions for their inclusion in the mirrored data because they have negligible difference in original and mirrored data. As for Glonass and BDS geostationary orbits and Iono Model (Klobuchar), it may be useful to provide a lookup table for use by the mirror time application to create mirrored correction data or a "hack" or special routine or substep as discussed below.

Figure 3:
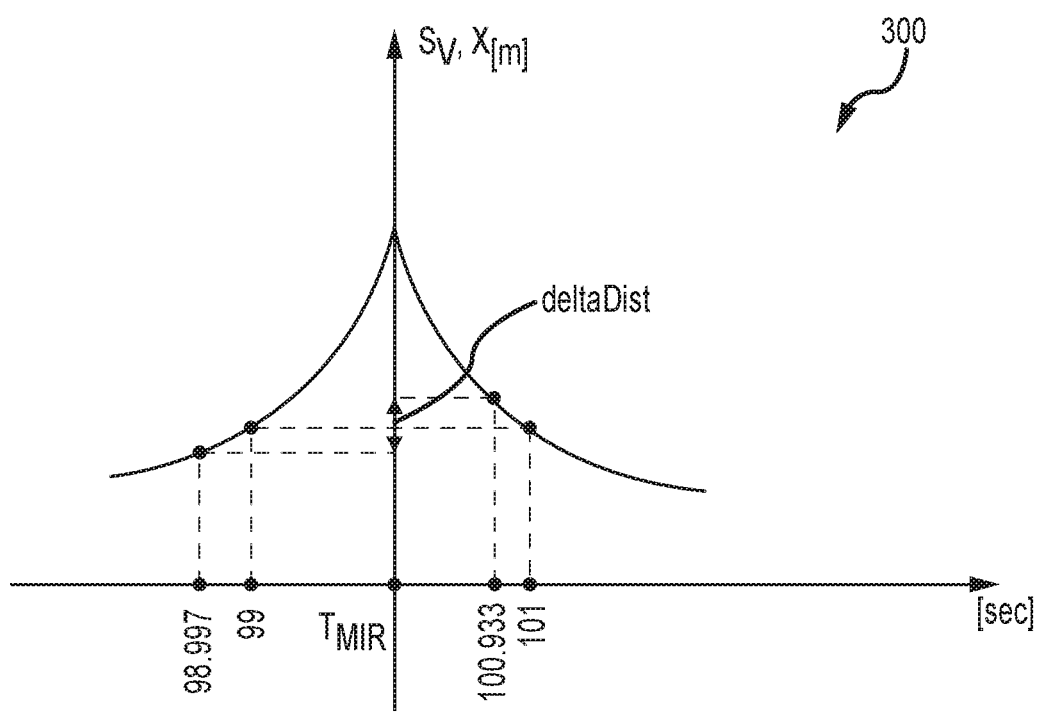
FIG. 3 is a graph illustrating a process of compensation of residuals as part of generating the mirrored GNSS data.

It may be useful to now consider residuals for the original and mirrored run. The residuals depend on satellite position, SVxyz, with mirrored ephemeris data provided by SVxyz2(T2=101)=SVxyz1(T1=99), for example. However, in the mirror time application, when computing calculated range, Dist(T), satellite position data, SVxyz, is used not on epoch time (such as T2=101) but, instead, on some transmit time such as T2=101−rawrangeSec(about 0.07)=100.93, which provides in this case SVxyz2(T2=100.93)=SVxyz1(T1=98.93). One way to compensate this difference in residuals is to add the difference of calculated distances (deltaDist) to the measurement data as shown by Meas2(T=101)=Meas1(T=99)+deltaDist( ) and this operation is shown with graph 300 of FIG. 3. Computation of distance, though, requires knowledge of position data. This position (trajectory) is preferably known with accuracy better than 50 meters (m). So, the mirror time method preferably receives as input or obtains a given position, such as in the form of a GGA message along with the original RINEX file. In some embodiments, the position is generated by the forward run through the PVT engine.

Figure 4:
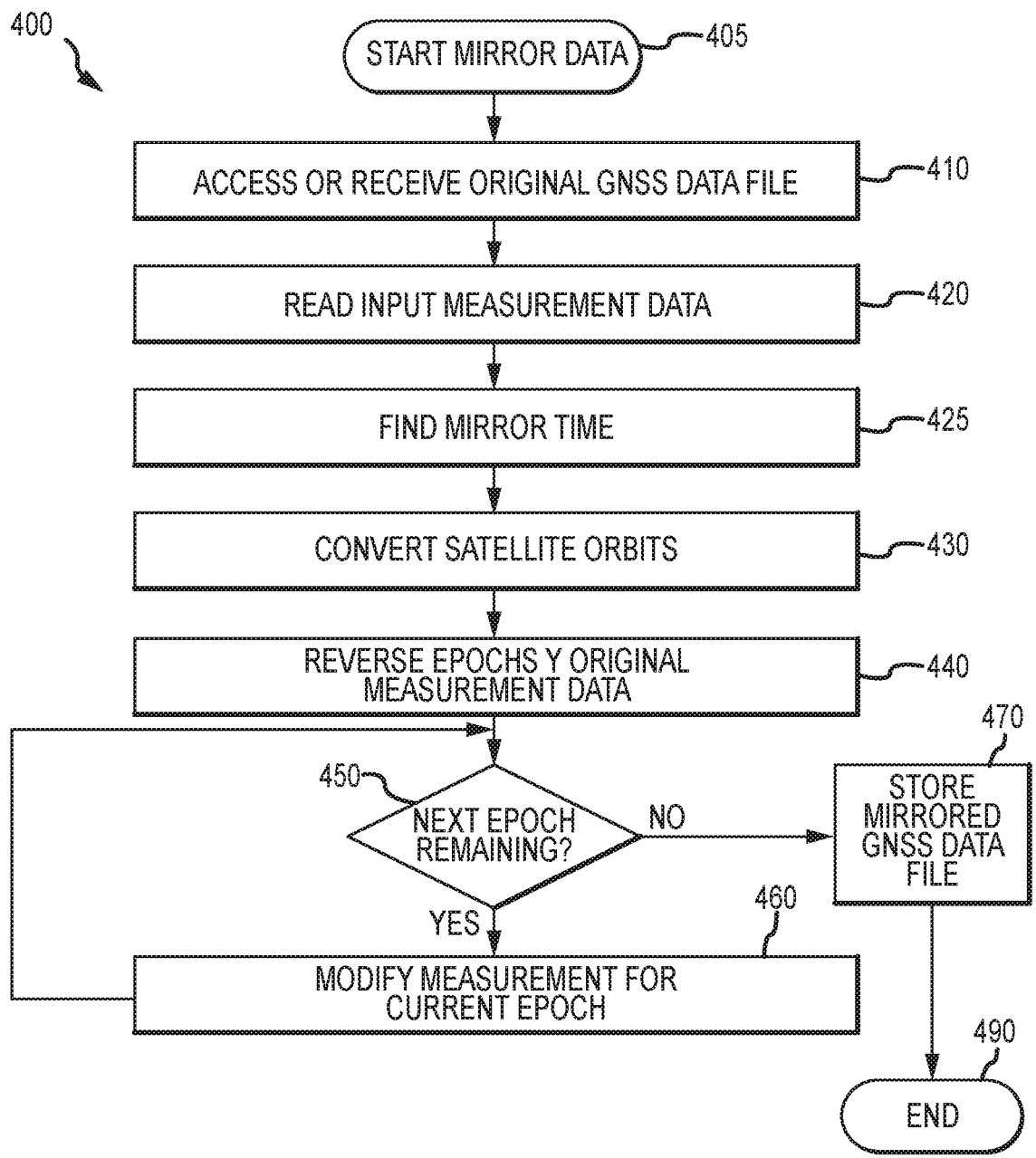
FIG. 4 is a flow diagram for the mirror time method useful for modifying input raw GNSS data to allow processing with a forward-only PVT engine.

FIG. 4 provides a flow diagram 400 for the mirror time method useful for modifying a set of GNSS data to provide mirrored GNSS data useful as input to a forward-only PVT engine to provide a result as if a backward run were performed. The method 400 starts at 405 such as with calling a mirror time application and selecting a set of raw GNSS data to be mirrored (e.g., a particular RINEX file or set of RINEX files such as a rover and a base file). The method 400 continues at 410 with accessing or receiving the GNSS data file for mirroring. In step 420, the method 400 involves reading the measurement data in the GNSS data file. Then, at step 425, mirror time is found, and mirror time may be around the middle of the time span (see graph 300 in FIG. 3).

The method 400 continues with step 430 and converting the satellite orbits in the read GNSS data file. As discussed above, mirroring orbits involves modifying the ephemeris in a manner that replicates the satellite flying back along the path defined in the input GNSS data file. Code examples for mirroring orbits is provided with functions MirrorKeplerEphemeris( ) and MirrorSbaEphemeris( ), which are provided in the Computer Program Listing Appendix provided at the end of the Detailed Description. In step 440, the epochs of the original measurement data are reversed.

The method 400 then continues at 450 with determining whether or not there remain any epochs to process. If yes, step 460 is performed to modify the measurement for the current epoch. The modification of measurements may involve the following: (1) modifying the range as Range2=Range1+deltaDist; (2) modifying the phase as Phase2=Phase1+deltaDist; (3) setting Snr2=Snr1; (4) modifying the doppler as Doppler2=−Dopper1+deltaCompVel (note that like range and phase data the Doppler needs some correction, but, instead of difference in calculated distance, the difference of calculated velocities can be used); (5) setting the loss of lock as CummulativeLossOfLock2=CummulativeLossOfLock1; and (6) setting PolarityFlag2=PolarityFlag1.

Figure 5:
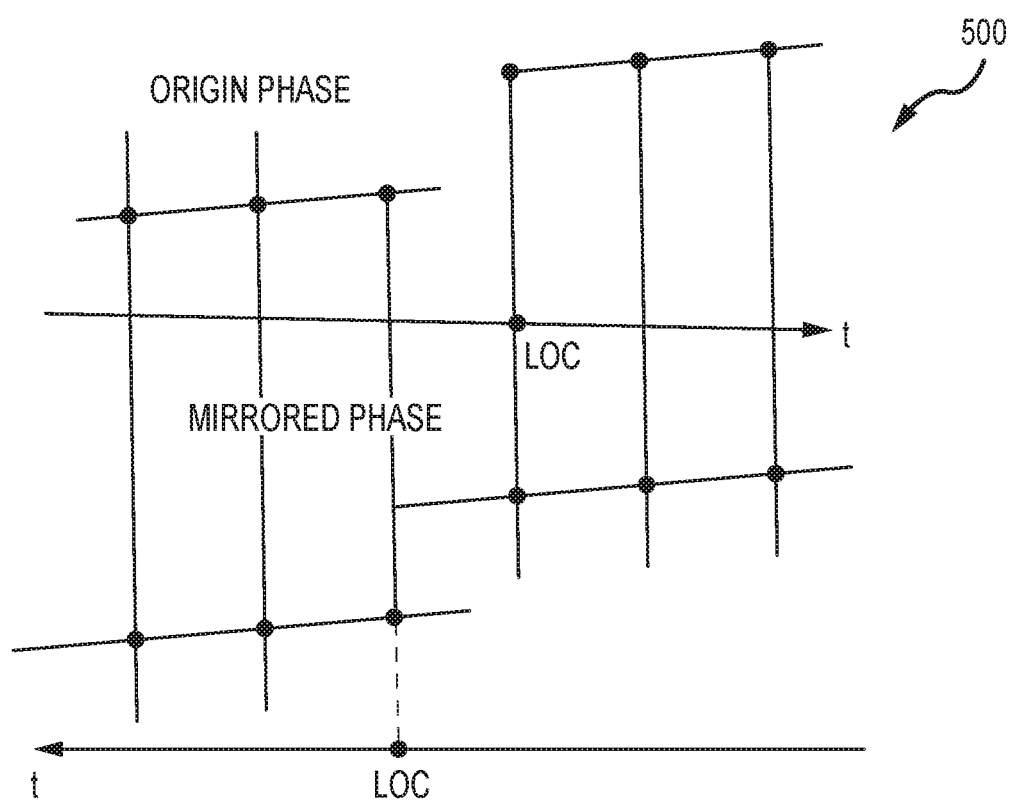
FIG. 5 is a graph showing phase data and loss of lock indicator for the original and mirror GNSS data.

The method 400 then checks at 450 to see if there are additional epochs to process. If not, the method 400 continues at 470 with storing in memory the mirrored GNSS data file for use as input to a forward-only PVT engine. The method 400 may then end at 490. In some cases, the cumulative loss of lock is not available and only instant loss of lock (LOC) is present. In this case, the loss of lock flag can be delayed by one epoch in the mirrored data. This feature of the mirroring process can be understood by observing the information in graph 500 of FIG. 5 that shows phase data for the original and mirrored GNSS data files.

In the prior paragraphs, the mirror time processes were described along with theoretical background information useful for implementation. In the following paragraphs, more attention is provided on how the mirror time concepts have been realized in application and exemplary engineering challenges that were solved by the inventors.

Figure 6:
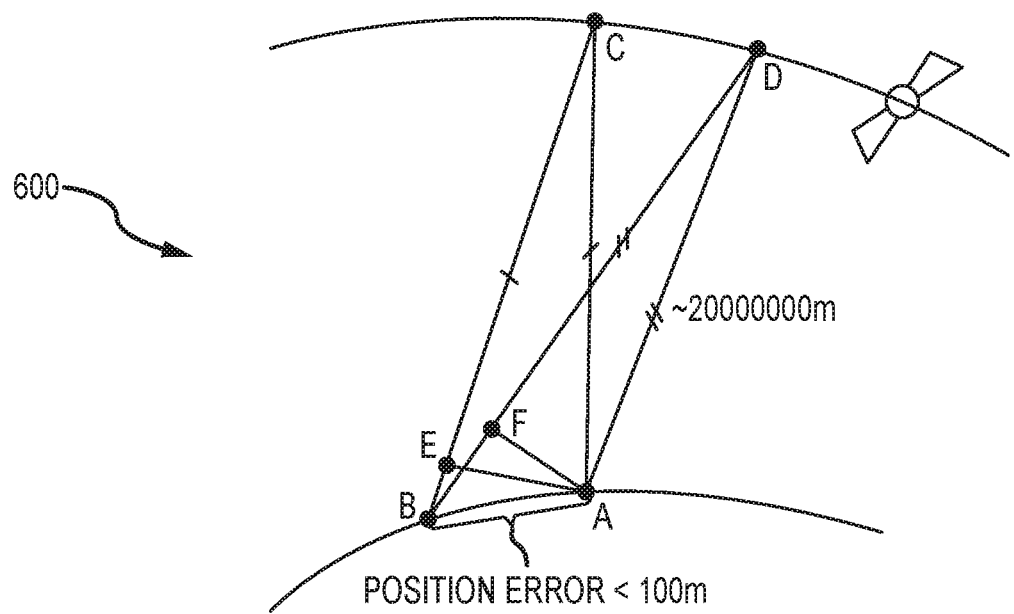
FIG. 6 is a graph illustrating the geometric task in determining accuracy desirable for position in mirroring of measurement data.

It was recognized that for correct mirroring of the measurement data that the position has to be known. However, it was not immediately clear what accuracy would be useful for this position. This can be addressed as a geometric task that is illustrated with graph 600 of FIG. 6. In graph 600, Point A is the true position of the GNSS receiver, Point B is the position with some error, Point D is the satellite position at time T1 (98.93 in the examples used herein), and Point C is the satellite position at time T2 (100.93). Mirror time is 100 sec. In this case, line B-F is the true delta distance (deltaDist) and line B-E is the delta distance with some error. Final error in measurement data will be Err=|BE−BF|. To find a maximum possible error, a long file may be used such as one for many hours (e.g., 24 hours). Position was shifted to XYZ={15, 15, 15} m from true position. For all satellites and epochs, Err=|BE-BF| was calculated with maximum error (MaxErr) equal to 0.06 cm, which is negligible.

Like range and phase, Doppler also should be compensated for velocity correction such as with Doppler2=-Dopplerl+deltaCompVel. Using the same approach as described above (Position shift {15, 15, 15}), the maximum error was found to be 0.002 Hz, which is also negligible and can be omitted. In the example above, mirror time was taken at the end of the GNSS data file (e.g., Tmir=100 sec), but, as discussed with reference to step 425 in FIG. 4, a more robust approach may be to take mirror time in the middle of the GNSS data file (e.g., Tmir=50 sec).

When mirroring orbits, time of orbit can become not compliant with ICD. For example, one can take a GPS orbit with Toe1=16 and mirror time Tmir=50 sec. In this case, new time would be Toe2=50+16=66, but Time Toe=66 sec is not compliant because time of GPS/GALILEO/QZSS/BDS orbits should be modulo 16 sec. For Glonass, they should be modulo 30 sec. There are three approaches that can be used to deal with this situation. First, the simplest approach, which the inventors used in one embodiment of the mirror time application, is to do nothing. Since RINEX files allow writing Toe with one second resolution there should not be any problems.

In other embodiments, though, a second approach may be used in which different mirror time is used for measurements and orbits. For example, one can use a Tmir=50 for measurement data, a Tmir=48 for GPS/GAL/QZS, a Tmir=30 for Glonass, and so on. This will work but could lead to less desirable performance due to error in mirrored measurements. Error has a linear dependence from length of line C-D in FIG. 6 or (which is the same) a difference in time of computing orbits for forward and backward runs (dt). When the mirror time for measurements and orbits is the same, dt=2*rawRangeInSec=0.14 sec. However, when time is different, dt=2*rawRangeInSec+2*(TmirMeas−TmirOrb). In the above example, Tmeas=50 and Tgps=48 so that dt=4.14, which is thirty times larger (i.e., 4.14/0.14).

In other embodiments, a third approach is used in which mirror time is not taken in the middle of the GNSS data file but near the middle in such a way that mirrored time will become compliant. In the example above, such time could be Tmir=48 sec, Toe2=48+16=64. This solves the problem only for GPS, GAL, and QZS but not for GLO and BDS. Generally, another mirror time can be found that will allow GPS, GAL, QZS, and GLO to be compliant but not BDS. BDS satellites have constant offset of 14 sec compared to GPS, and it may be difficult to find compliant mirror times for GPS and BDS simultaneously.

Previously, it was noted that there is not a simple way to mirror Glonass and BDS geostationary orbits. At first glance, one may be surprised that there is any trouble caused by trying to mirror Glonass orbits. They have acceleration, velocity, and position on Tb point. However, simply changing signs of velocities is not enough to mirror the orbit. The issue here is that Glonass orbit parameters are calculated in inertial frame, which already includes Earth rotation parameters. To explain this concept, a simple example can be given. One can imagine they are throwing a ball with the same direction as the wind blows. Trying to mirror that ball's trajectory, one cannot change the direction of the wind so that it is not easy to determine equations for mirroring the ball's trajectory.

Hence, to enable GLO and BDS GEO processing, some hacks were created and used by the inventors. Processing applications (such as Blade, Titan, and the like) with such a hack should know that it is working with a mirrored GNSS data file (and the mirror time value) and enable specific algorithms for correct processing. Mirroring for Glonass ephemeris is described in function MirrorGloEphemeris ( ) provided in the Computer Program Listing Appendix provided at the end of the Detailed Description. On the processing side, though, a hack can be used such as the one described in function deq ( ) (with bolded font) in the Computer Program Listing Appendix provided at the end of the Detailed Description. Mirroring BDS geostationary orbit data is done as described in function MirrorKeplerEphemeris ( ) provided in the Computer Program Listing Appendix provided at the end of the Detailed Description, and, on the processing side, a hack can be used as described in function eph2pos ( ) (with bolded font) provided in the Computer Program Listing Appendix provided at the end of the Detailed Description. When creating a mirrored GNSS data file, the iono parameters are not changed, but, in the processing application, the hack can be used from function ionmodel ( ) (with bolded font) (with knowledge of the mirror time value) found in the Computer Program Listing Appendix provided at the end of the Detailed Description.

Another practical challenge to consider is how mirror time information should be injected or introduced into the processing application. This can be done using new command line options, but this may require additional modifications in source code and may call for manually specifying a mirror time value, which may not be known to a user. To overcome this difficulty, one embodiment was designed that put the required information into the mirrored navigation data. For example, UTC data Wn and Tow may be used. If Wn==1000, then we are working with the mirrored file, and, in this case, Tow may equal the mirrored time. When working with the mirrored file, the processing application will output data in another time scale. For example, the original GNSS data file may have a time scale or epochs of 0 to 20 seconds while the mirrored GNSS data file may have a time scale or epochs of 20 to 40 seconds with mirror time equal to 20 seconds. Output from the original forward processing run in the PVT application may be $GPGGA, 000000.00 . . . ; $GPGGA, 000001.00 . . . ; . . . ; $GPGGA, 000020.00 . . . while output form the mirrored run through the PVT application may be $GPGGA, 000020.00 . . . ; $GPGGA, 00021.00 . . . ; . . . ; $GPGGA, 000040.00 . . . .

To provide a combiner application, a new application is provided that will match position information from the forward and backward runs. To do this, the combiner is provided the mirror time. This time will help the combiner "to understand" that GPGGA, 000039=GPGGA,000001. To escape all the above difficulties, a hack command/routine may be used in an existing forward only PVT application (such as Blade). When this command is received, Blade (or another PVT application) modifies NMEA time (like it was in the original file) when running with the mirrored GNSS data file. With this command, output from the PVT application from the mirrored run may be $GPGGA, 000020.00 . . . ; . . . ; $GPGGA, 000001.00 . . . ; $GPGGA, 000000.00 . . . . A utility such as the tac utility (from cygwin or linux) and reverse output from the mirrored run. After this, it is relatively easy to merge or combine position results from the original and mirrored runs (e.g., the FP and BP outputs).

In some embodiments, the mirror time application/executable (or mirrored GNSS data generator) uses RINEX files as input and output. Other file or data exchange formats may be used in other embodiments, but RINEX files are desirable for numerous reasons. RINEX reading and writing is directly supported by RTKLIB, which is an open source program package for standard and precise positioning with GNSS often used for post-processing (or post-processed kinematics) and was used by the inventors in their prototyping efforts (as can be seen in the code snippets provided in the Computer Program Listing Appendix (and all snippets are using RTKLIB structures)). Hence, RTKLIB is useful because there is no private source code, it is a widely used and available commodity, and it is relatively easy to explain source code using RTKLIB.

RINEX reading and writing does not require additional libraries and can be compiled on any target using RTKLIB package. RINEX has a minimum number of fields that are clear and have been standardized for a very long time. RINEX is an open format supported by all vendors and tools. To create a mirror file, the mirror time application reads RINEX from end. Since we have native support of RINEX in RTKLIB, we can do this easily, but if another input format is used (source files for decoding are not available), this may not be possible. In such a case, all read epochs will have to be buffered somewhere. If they are buffered in RAM, then it may be difficult to process large files. If they are buffered on HDD, processing time may be significantly slower. RINEX is also desirable because in includes a separate ephemeris file, which guarantees that there will not be moments when orbits cannot be computed. RINEX is also useful because it does not have restrictions to Toe field resolution so that any integer second mirror time can be selected for all orbits.

The mirror time application may be configured to have a special support for kinematic data. To minimize errors in mirrored data, it is desirable to know position in each epoch. Since a RINEX file does not have position information (only first point), the mirror time application searches NMEA files (with GPGGA strings) and uses position from them. GNSS receivers relay computed GNSS variables such as position, velocity, course, and the like to a peripheral (e.g., the post-processing system/device described herein), and the more important elements of receiver information are broadcast in a special format standardized by the National Marine Electronics Association (NMEA) such that the messages are labeled NMEA messages.

The new mirror time method provides an elegant way to get backward processing results with a conventional forward processing engine. It also provides additional advantages. Problem moments of a forward run can be identified and then the backward run can be used for analysis of what went wrong or caused the problem in the forward run.

Still further, post-processing is evolving from one big application into a number of smaller utilities. This provides flexibility, fast debugging, easier releases, and decreasing development and validation time. Each basic component (e.g., original data, data converter, recurrent PVT engine, mirror time application, combiner, and so on) of the post-processing system (or software suite) has clear goals and interfaces. This allows post-processing tasks to be efficiently shared among different design and development teams. Additionally, post-processing with the mirror time method is not Win32 centered, which may be desirable because the post-processing can be performed (or software run) on any computing device including the GNSS receiver itself (or a hardware tool with a GNSS receiver).

It may be useful at this point in the description to provide a brief review of some of the core concepts of the mirror time technology and generating a mirrored GNSS data file for input into a forward-only PVT engine. If an initial input is a first RINEX file ("RINEX1") for 101 seconds, a second RINEX file ("RINEX2") can be created. This involves mirroring the GNSS observation epochs in RINEX1 in such a way that: RINEX1(100)=RINEX2(0); RINEX1(99)=RINEX2(1); . . . ; and RINEX1(0)=RINEX2(100). Next, in the creation of a mirrored GNSS data file, the RINEX1 ephemeris data is modified in such a way that orbit calculations become mirrored: Calc1(100)=Calc2(0); Calc1(99)=Calc2(1); . . . ; and Calc1(0)=Calc2(100). Once the mirrored RINEX observation and navigation file is created, it can be processed with a forward run in a PVT engine to get results like it were processing using backward processing.

The mirror time method involves more than simply mirroring the time tag of the GNSS observations. Instead, the method includes applying special corrections to measurements (code, phase, and doppler). Generally, mirror time should be different for observations and orbits but should be the same for base and rover. Also, to make measurement corrections, rough position (e.g., plus or minus 50 meters) should be known or determined. It is likely that the mirror time method will work well for autonomous positioning and baseline processing.

Testing of the mirror time application and its use with a forward-only PVT engine was performed. Existing tools allowed mirror time performance to be evaluated with a wide range of GNSS data and use cases. The test results proved that the mirror time concept can noticeably improve post-processing performance by reusing an existing real-time PVT engine. With these results, the mirror time approach can easily be recommended for integration into post-processing software that includes a real-time, forward-only PVT engine such as Mobile Mapper Office, Easy Post Process, and the other software products that already use the Blade engine (or other PVT engine).

One test run involved collection of GNSS data from a base (SP60, 1 Hz, with open sky) and a rover (uBlox, GGG, L1, 10 Hz, MM50 with external antenna) that involved a standard Nantes Drive routine with MM50 and multiple open sky and under bridge loops. The challenging loops in this test case corresponded to spaces under bridging, and the test was run to find the availability of an ambiguity fixed solution before and after bridging. In the forward run, plotting of data showed that no fixed positions are seen after passing under a bridge. The run with the mirrored GNSS data adds fixed positions, and plotting of the combined data shows the fixed position is seen almost immediately after passing under a bridge. This is because from the point of view of the mirrored data and the backward run this part of the loop corresponds to "approaching" the bridge. Hence, it can be concluded that the L1-only solution with uBlox or other GNSS can be noticeably improved for automotive post-processing using the mirror time techniques taught herein.

A second test run involved collection of GNSS data from a base (Some Yellow receiver, 1 Hz, RINEX-2.11, Gps&Glonass) and a rover (Catalyst T04, 1 Hz) that involved a long (e.g., >70 km) open sky baseline with stop and go scenario. This test was performed to determine whether the mirror time concept would be useful when post-processing accuracy is bad at the beginning of a stop and go job over long baseline. Plotting of the forward and backward runs showed a much better mirrored position compared to a forward position at the start of data collection. Hence, proper combination of the positions of the forward and backward runs using the mirrored GNSS data will be very effective at improving position accuracy in this positioning application or environment.

A third test run involved collection of GNSS data from a base (PF800, Carquefou, 1 Hz, RINEX-2.11, Gps&Glonass) and a rover (MB-Two board, atl. Log, 10 Hz) that involved a Standard Nantes Drive routine with MB-Two, with multiple open sky and under bridge loops. This test run was performed to focus on the availability of drive L1/L2 professional solution when passing under a bridge. From a generated plot showing all positions for both the forward run and backward run with the mirrored GNSS data, it was seen that positions from the backward run were flatter and more robust. Reasonable combining of both runs would make the trajectory near the bridge very good. Another plot was generated showing evolutions of position flag around the bridge for forward and mirror data-based runs, and these show how well-fixed positions (GGA,4) were restored after passing the bridge when using the mirror time run.

A fourth test run involved collection of GNSS data from a base (SP60, 1 Hz, and open sky) and a rover (uBlox, Gps&Glonass&Galileo, L1, 10 Hz, MM50 with internal antenna (e.g., of very bad quality)) that involved local area walking loops with MM50 over standard Nantes shaded routine. Plotting of the results of forward and backward runs through a PVT engine showed that the loops were well shaded and edge points were well shaded, too. The plots showed that the backward run is even better than the forward run. It was obvious to the inventors from a review of the plotted test run data that the mirror time concept works very well even for "super-bad" GNSS data such that Mobile Mapper Office is a potential target for integration of the new post-processing techniques taught herein.

A fifth test run involved collection of GNSS data from a base (SP90m, 1 Hz, Gps&Glonass&Galileo) and a rover (SP20, internal antenna, Gps&Glonass&Galileo) that involved local area walking loops between open sky and shaded sky points (Nantes). This test run was performed to investigate the mirror time concept with relation to ambiguity of fixed positions. In the test, a Trotter handheld (L1/L2) was traveling between open sky and shaded points. From the test results, it was clear that open sky points reliability will be obviously improved having alternative (forward and mirror) estimates. The shaded sky (ambiguous fixed) points availability as well as point approaching/leaving stages will also be noticeably improved due to use of the mirrored GNSS data in a "backward" run with the conventional forward run.

With regard to the forward/backward combiner, it may be useful for the combiner of the forward and backward runs to combine on full state vector solution and/or to combine in position domain only. The combining algorithm may take a variety of forms such as the Fraser-Potter combiner. Combining in position domain (e.g., for 3D position) only often will be adequate, but it may be useful to include some robust add-ons which possibly can include extra smoothing between epochs. From the forward and backward runs through the PVT engine, we have 3D positions, x1 and x2, with associated covariance, p1 and p2. Theoretically, the optimal formula for combined position is: d1=inv(p1); d2=inv(p2); P=inv(d1+d2); and X=P*(d1*x1+d2*x2). This theoretical formula can be augmented by: (a) simplest selection is the best selection (e.g., by GGA flag); (b) reasonable robust decision which should include also accepting given epoch as incorrect; (c) possible smoothing solutions among adjacent epochs; (d) possible reporting (adaptively detected) static/kinematic flag; and (e) taking into account computed velocity.

When designing a combiner, it should be remembered that there often will be more than a single forward and single backward run solution. For example, it can be predicted that in the future more alternative "independent" position results can be combined into a final user solution, e.g., if one wants to combine and/or compare Blade and Titan positions. In this case, one should foresee running the combining procedure more than once or running it with more than two position sources. The combiner should be abstract epoch-by-epoch independent procedure, which combines more than two "independent position solutions" using FP algorithm or another similar process.

With regard to an interface, it may be useful when designing the combiner to create an equal structure/message interface for the library/executable combiner. Each single solution to be combined should deliver position data, velocity data, and base information such as: run ID; combine ID; timestamp; 3D position; respective 3×3 (6 numbers) covariance; position flag, 3D velocity; respective 3×3 (6 numbers) covariance; velocity flag; base position; cumulative indicator of base changes; base accuracy indicator; base ID; and base datum ID. Also, every combined solution output by the combiner typically will provide the very same output data. It is supposed that reported positions are expressed in the datum of base, and base can be none, physical, VRS, or GVRS (generated from RTX, SBAS, and so on). For some runs or epochs, the particular solution may not be available for whatever reason, and this can be indicated in position or velocity flag. Also, for some epochs, the combined solution may not be available for whatever reason, and this can be indicated in position or velocity flag.

To further clarify the above discussion, it may be useful to review and expand on terms and language used and also to provide brief overviews of unique features of the new mirror time technology. Differential positioning is the process that includes correcting local receiver observables (or internal PVT engine states) using some data available from external sources. Correcting data can be divided into two groups: Measurement Space (MS) corrections and State Space (SS) corrections. MS corrections are numbers that are simply added to the respective local measurement to cancel (or at least reduce) some systematic errors. A typical example of MS corrections is either DGNSS corrections (e.g. RTCM-2 Message Type 1, 31) or RTK corrections (e.g. RTCM-3 Message Type 1004, 1012). The primary attribute of MS corrections is the position (reference) they are tagged to. MS corrections usually serve a local area around the reference position. MS corrections can correspond to either a physical or virtual reference station. RTK network corrections (MAC, FKP) can be considered as augmentations of MS corrections to extend the area of applicability.

SS corrections are the estimates of particular errors affecting GNSS observations. SS corrections include satellite orbit and clock corrections, ionosphere corrections, satellite signals bias estimates, and some other corrections. SS corrections are usually not tagged to any reference position and serve wider areas compared to MS corrections but are not always global. For example, the ionosphere correction parameters can be available only for some continents, e.g., the WAAS ionosphere grid is only available over the USA. The typical example of an SS corrections source is SBAS and L-band. Unlike precise MS corrections, the current status of SS corrections does not allow receivers to determine centimeter level positions instantly. But, the latest progress with the so-called PPP (Precise Point Positioning) solutions using precise, almost real-time IGS products will lead to fast enough convergence to centimeter level accuracies in the near future. Depending on the organization of the PVT engine, SS corrections can be applied differently. For example, Trimble's receivers may transform SS corrections into MS corrections (with associated accuracy figures) referring to the receiver's current position (so called GVRS data structure). The PVT engine then applies these MS corrections to receiver observations in standard manner.

In the above discussion, terms and language were intended to have meanings used and recognized by those skilled in the arts of satellite navigation and related fields. For example, PVT was used to represent Position/Velocity/Time, and GNSS raw data includes GNSS observations plus GNSS navigation data (which can be presented as a real time stream or as a file). In this regard, GNSS observations typically will include code, carrier, doppler, and SNR measurements made by a GNSS receiver when tracking GNSS satellite signals. GNSS navigation data may be GNSS almanac, GNSS ephemeris, GNSS time data, and GNSS ionosphere data extracted from GNSS satellite signals. A PVT engine typically will be the engine computing PVT using GNSS raw data (plus differential corrections). RTK or Real Time Kinematic refers to a precise PVT running in receiver in real time using differential corrections. PP or Post Processing is the method used to determine PVT using Office/Cloud based software by processing GNSS raw data files from at least single receiver.

A base receiver is a GNSS receiver generating differential corrections. Differential service is an infrastructure generating differential corrections, and a rover receiver is a GNSS receiver accepting differential corrections. In this regard, differential corrections are streams bringing differential data from a base receiver or a differential service to a rover RTK engine. Measurement Space (MS) corrections are corrections to GNSS observations (code and carrier), and State Space (SS) corrections are corrections to particular errors affecting GNSS observations (satellite orbit andclock errors, atmospheric errors, and/or Satellite induced biases). PRS refers to a Physical Reference Station while VRS refers to a Virtual Reference Station and GVRS to a Global Virtual Reference Station. Further, with regard to the present description, RTCM corrections provide a standardized presentation of differential corrections, and RINEX raw data provides a standardized presentation of GNSS raw data. A forward run is PVT processing of GNSS raw data with increased time tags, and a backward run is PVT processing of GNSS raw data with decreased time tags. Additionally, virtual time is a time arrow generated from original time tags tagged to collected GNSS raw data, and mirror time is specifically generated virtual time running forward. Further, mirror data is virtual GNSS raw data corresponding to mirror time.

With regard to PVT in real time and post processing, a PVT engine running in real time receiver processes: (a) own GNSS raw data epoch structures and (b) GNSS corrections coming via external data link. The same PVT engine running in PC processes: (a) own (rover) GNSS raw data file and (b) an external (base) GNSS raw data file. In other words, in addition to real time PVT, post processing PVT includes base/rover GNSS raw data readers/parsers. The core PVT algorithm is the very same for real time and post processing, which proves the validity of using real time PVT engine for post processing applications.

At this point in the description, it may be helpful to describe exemplary use cases where the mirror time concept can be applied. The concept is applicable to more than single rover data and more than single rover-base data pair. In general, the new mirror time technology can be equally applied to all simultaneously downloaded raw data files. The concept is applicable to whole file(s) or any part of the file(s). The concept is equally applicable to any raw data format such as, but not limited to proprietary formats (e.g., Trimble*.T0x raw data format) or standardized formats (e.g., RINEX). The concept is also applicable to any SS correcting data (e.g., SBAS, Lband, and the like). First, SS correcting data are transformed to GVRS raw data by SS-to-MS transformation. Then, GVRS raw data are mirrored as any other raw data file. The mirror time processing can run on any target from a receiver up to the Cloud (or devices linked to or available over the Cloud or any data communications network). The concept is applicable to near real time positioning inside the rover receiver. For this application, receiver and correcting data are buffered in receiver memory and then can be mirrored and post processed in background of real time receiver PVT.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only. As will be clear to those skilled in the arts, the description and following claims teach and cover at least: (a) a new post-processing concept that is applicable to more than single rover data and more than single rover-base data pair, but, instead, the MirrorTime ideas can be equally applied to all simultaneously downloaded raw data files; (b) the post-processing concept is applicable to whole file(s) or any part of the file(s); (c) the concept is equally applicable to any raw data format (proprietary or standardized); (d) the post-processing techniques are also applicable to any SS correcting data (e.g. SBAS, Lband) (e.g., first, SS correcting data are transformed to GVRS raw data by SS->MS transformation, and, second, GVRS raw data are mirrored as any other raw data file); (e) the MirrorTime processing can run on any target from receiver up to the Cloud; and (f) the concepts described and claimed herein are applicable to near real-time positioning inside the rover receiver (e.g., for this goal, receiver and correcting data are buffered in receiver memory and then can be Mirrored/Post Processed in background of Real Time receiver PVT).

Computer Program Listing Appendix

APPENDIX A

Some code snippets for mirroring ephemeris data. All snippets are using Rtklib structures

```
//========================================================
#define MU_GPS 3.9860050E14 /* gravitational constant ref [1] */
#define MU_GLO 3.9860044E14 /* gravitational constant ref [2] */
#define MU_GAL 3.986004418E14 /* earth gravitational
constant ref [7] */
#define MU_CMP 3.986004418E14 /* earth gravitational constant
ref [9] */
#define OMGE_GLO 7.292115E-5 /* earth angular velocity (rad/s)
ref [2] */
#define OMGE_GAL 7.2921151467E-5 /* earth angular velocity
(rad/s) ref [7] */
#define OMGE_CMP 7.292115E-5 /* earth angular velocity
(rad/s) ref [9] */
bool MirrorKeplerEphemeris(const gtime_t& mirrorTime,
const eph_t& eph, eph_t& eph2)
{
eph2 = eph;
double mu, omge;
int sys, prn;
switch ((sys = satsys(eph.sat, &prn))) {
case SYS_GAL:
mu = MU_GAL; omge = OMGE_GAL; break;
case SYS_GPS:
mu = MU_GPS; omge = OMGE; break;
case SYS_QZS:
mu = MU_GPS; omge = OMGE; break;
case SYS_CMP:
mu = MU_CMP; omge = OMGE_CMP; break;
default:
return false;
}
double addToTimeToe = 2 * timediff(mirrorTime, eph2.toe);
eph2.toes = eph.toes + addToTimeToe;
eph2.deln = -eph.deln - 2 * sqrt(mu / (eph.A*eph.A*eph.A));
eph2.idot = -eph.idot;
eph2.OMG0 = eph.OMG0 + omge*addToTimeToe;
eph2.OMGd = 2 * omge - eph.OMGd;
if (sys == SYS_CMP&&prn <= 5)
eph2.OMGd = -eph.OMGd;
eph2.toe = timeadd(eph2.toe, addToTimeToe);
double addToTimeToc = 2 * timediff(mirrorTime, eph2.toc);
eph2.toc = timeadd(eph2.toc, addToTimeToc);
double addToTimeTtr = 2 * timediff(mirrorTime, eph2.ttr);
eph2.ttr = timeadd(eph2.ttr, addToTimeTtr);
eph2.f1 = -eph.f1;
return true;
}
//========================================================
bool MirrorSbaEphemeris(const gtime_t& mirrorTime,
const seph_t& eph, seph_t& eph2)
{
eph2 = eph;
eph2.afl = -eph2.afl;
eph2.vel[0] = -eph2.vel[0];
eph2.vel[1] = -eph2.vel[1];
eph2.vel[2] = -eph2.vel[2];
double addToTimeToe = 2 * timediff(mirrorTime, eph2.t0);
eph2.t0 = timeadd(eph2.t0, addToTimeToe);
double addToTimeTof = 2 * timediff(mirrorTime, eph2.tof);
eph2.tof = timeadd(eph2.tof, addToTimeTof);
return true;
```

APPENDIX A-continued

Some code snippets for mirroring ephemeris data. All snippets are using Rtklib structures

```
}
{
//============MirrorGloEphemeris======================
bool MirrorGloEphemeris(const gtime_t& mirrorTime,
const geph_t& eph, geph_t& eph2)
{
eph2 = eph;
eph2.gamn = -eph2.gamn;
eph2.vel[0] = -eph2.vel[0];
eph2.vel[1] = -eph2.vel[1];
eph2.vel[2] = -eph2.vel[2];
double addToTimeToe = 2 * timediff(mirrorTime, eph2.toe);
eph2.toe = timeadd(eph2.toe, addToTimeToe);
double addToTimeTof = 2 * timediff(mirrorTime, eph2.tof);
eph2.tof = timeadd(eph2.tof, addToTimeTof);
return true;
}
```

APPENDIX B

Some code snippets for hack in processing mirroring ephemeris data. All snippets are based on Rtklib structures/functions. In red, parts that need to be modified

```
/* glonass orbit differential equations ---------------------------------*/
static void deq(const double *x, double *xdot, const double *acc)
{
...
if (gMirrorTime) //If processing Mirrored File
{
xdot[3] = (c + omg2)*x[0] - 2.0*OMGE_GLO*x[4] + acc[0];
xdot[4] = (c + omg2)*x[1] + 2.0*OMGE_GLO*x[3] + acc[1];
}
else
{
xdot[3] = (c + omg2)*x[0] - 2.0*OMGE_GLO*x[4] + acc[0];
xdot[4] = (c + omg2)*x[1] + 2.0*OMGE_GLO*x[3] + acc[1];
}
...
}
extern void eph2pos(gtime_t time, const eph_t *eph, double *rs, double
*dts,
double *var)
{
...
/* beidou geo satellite (ref [9]) */
if (sys==SYS_CMP&&prn<=5) {
...
sino=sin(omge*tk); coso=cos(omge*tk);
if (gMirrorTime)
sino = -sino;
}
...
}
extern double ionmodel(gtime_t t1, const double *ion, const double
* pos,
const double *azel)
{
...
gtime_t t = t1;
if (gMirrorTime > 0)
{
gtime_t gMirrorTime_t;
gMirrorTime_t.time = gMirrorTime;
gMirrorTime_t.sec = 0;
double difTime = timediff(gMirrorTime_t, t);
t = timeadd(t, 2 * difTime);
}
...
}
```

We claim:

1. A system for post-processing global navigation satellite system (GNSS) data to enhance position accuracy, comprising:
a processor;
memory storing a GNSS data file;
a first set of code executed by the processor to provide a position, velocity, and time (PVT) application, wherein the PVT application processes the GNSS data file with a forward run to generate a first forward run position file;
a second set of code executed by the processor to provide a mirror time application modifying the GNSS data file to generate a mirrored GNSS data file, wherein the PVT application processes the mirrored GNSS data file with a forward run to generate a second forward run position file; and
a third set of code executed by the processor to provide a combiner application combining the first and second forward run position files to generate a precise position file including position data with higher accuracy at one or more epochs than in only one of the first and second forward run position files,
wherein the mirrored GNSS data file comprises measurement epochs of the GNSS data file in reverse order.

2. The system of claim 1, wherein the GNSS data file includes a GNSS file from a base and a GNSS file from a rover.

3. The system of claim 1, wherein the GNSS data file and the mirrored GNSS data file are Receiver Independent Exchange Format (RINEX) files.

4. The system of claim 1, wherein the PVT application is a forward-only PVT application.

5. The system of claim 1, wherein the mirror time application modifies measurements read from the GNSS data file to form mirrored measurements in the mirrored GNSS data file including, for each of the reverse order measurement epochs, modifying range and phase by difference in calculated distance and modifying doppler by difference in calculated velocity.

6. The system of claim 1, wherein residuals in the GNSS data file at each of the measurement epochs match residuals in the mirrored GNSS data file at each of the reverse order measurement epochs.

7. The system of claim 6, wherein the mirror time application mirrors orbit data provided in the mirrored GNSS data file by modifying ephemeris in the GNSS data file such that a satellite associated with data in the GNSS data file is flying backwards based on its satellite positions.

8. A system for post-processing global navigation satellite system (GNSS) data to enhance position accuracy, comprising:
a position, velocity, and time (PVT) engine performing a forward run on a GNSS data file to generate a forward processing (FP) position file;
a mirrored GNSS data generator modifying the GNSS data file to generate a mirrored GNSS data file, wherein the PVT engine further operates to perform a forward run on the mirrored GNSS data file to generate a backward processing (BP) position file; and
a FP/BP combiner combining the FP and BP position files to generate a position file including position data at a plurality of epochs, wherein the mirrored GNSS data file comprises mirror measurements at each of the plurality of epochs in reverse order.

9. The system of claim 8, wherein the GNSS data file and the mirrored GNSS data file are Receiver Independent Exchange Format (RINEX) files and wherein the PVT engine is a real-time and forward-only PVT engine.

10. The system of claim 8, wherein the mirrored GNSS data generator modifies measurements read from the GNSS data file to form the mirror measurements in the mirrored GNSS data file including, for each of the reverse order measurement epochs, modifying range and phase by difference in calculated distance and modifying doppler by difference in calculated velocity.

11. The system of claim 8, wherein residuals in the GNSS data file at each of the measurement epochs correspond to residuals in the mirrored GNSS data file at each of the reverse order measurement epochs.

12. The system of claim 11, wherein the mirror time application mirrors orbit data provided in the mirrored GNSS data file by modifying ephemeris in the GNSS data file such that a satellite associated with data in the GNSS data file is flying backwards based on its satellite positions.

13. A method of post-processing global navigation satellite system (GNSS) data to enhance position accuracy, comprising:
generating a first forward run position file by performing forward processing (FP) of a GNSS data file, wherein the first forward run position file includes first position data at a plurality of epochs;
reading the GNSS data file to obtain measurements at the plurality of epochs;
reversing the plurality of epochs and modifying the GNSS data file including the measurements at the plurality of epochs to generate a mirrored GNSS data file;
generating a second forward run position file by performing the FP of the mirrored GNSS data file, wherein the second forward run position file includes second position data at the plurality of epochs; and
combining the first and second forward run position files to generate a final position file including position data based on the first and second position data at each of the plurality of epochs,
wherein the modifying of the measurements includes, for each of the reverse order measurement epochs, modifying range and phase by difference in calculated distance and modifying doppler by difference in calculated velocity.

14. The method of claim 13, wherein the GNSS data file includes a GNSS file from a base and a GNSS file from a rover.

15. The method of claim 13, wherein the GNSS data file and the mirrored GNSS data file are Receiver Independent Exchange Format (RINEX) files.

16. The method of claim 13, wherein FP is performed by a computer running a forward-only PVT application.

17. The method of claim 13, further comprising modifying residuals in the GNSS data file at each of the measurement epochs match so that residuals in the mirrored GNSS data file at each of the reverse order measurement epochs is the same as the residuals in the GNSS data file.

18. The method of claim 17, further including mirroring orbit data for inclusion in the mirrored GNSS data file by modifying ephemeris in the GNSS data file such that a satellite associated with data in the GNSS data file is flying backwards based on its satellite positions.

19. A method of post-processing global navigation satellite system (GNSS) data to enhance position accuracy, comprising:
generating a first forward run position file by performing forward processing (FP) of a GNSS data file, wherein the first forward run position file includes first position data at a plurality of epochs;

reading the GNSS data file to obtain measurements at the plurality of epochs;

reversing the plurality of epochs and modifying the GNSS data file including the measurements at the plurality of epochs to generate a mirrored GNSS data file;

generating a second forward run position file by performing the FP of the mirrored GNSS data file, wherein the second forward run position file includes second position data at the plurality of epochs;

combining the first and second forward run position files to generate a final position file including position data based on the first and second position data at each of the plurality of epochs; and modifying residuals in the GNSS data file at each of the measurement epochs match so that residuals in the mirrored GNSS data file at each of the reverse order measurement epochs is the same as the residuals in the GNSS data file.

20. The method of claim 19, wherein the GNSS data file includes a GNSS file from a base and a GNSS file from a rover.

21. The method of claim 19, wherein the GNSS data file and the mirrored GNSS data file are Receiver Independent Exchange Format (RINEX) files.

22. The method of claim 19, wherein FP is performed by a computer running a forward-only PVT application.

23. The method of claim 19, further including mirroring orbit data for inclusion in the mirrored GNSS data file by modifying ephemeris in the GNSS data file such that a satellite associated with data in the GNSS data file is flying backwards based on its satellite positions.

* * * * *